United States Patent
Tsuda

(10) Patent No.: US 9,925,595 B2
(45) Date of Patent: Mar. 27, 2018

(54) CUTTING INSERT AND CUTTING TOOL

(71) Applicant: KYOCERA Corporation, Kyoto-shi, Kyoto (JP)

(72) Inventor: Yuichi Tsuda, Yasu (JP)

(73) Assignee: KYOCERA CORPORATION, Kyoto-Shi, Kyoto (JP)

( * ) Notice: Subject to any disclaimer, the term of this patent is extended or adjusted under 35 U.S.C. 154(b) by 216 days.

(21) Appl. No.: 14/422,181

(22) PCT Filed: Sep. 27, 2013

(86) PCT No.: PCT/JP2013/076357
§ 371 (c)(1),
(2) Date: Feb. 18, 2015

(87) PCT Pub. No.: WO2014/051086
PCT Pub. Date: Apr. 3, 2014

(65) Prior Publication Data
US 2015/0224581 A1 Aug. 13, 2015

(30) Foreign Application Priority Data
Sep. 27, 2012 (JP) .................................. 2012-214486

(51) Int. Cl.
*B32B 27/04* (2006.01)
*B23B 27/04* (2006.01)

(52) U.S. Cl.
CPC ...... *B23B 27/045* (2013.01); *B23B 2200/321* (2013.01); *Y10T 407/22* (2015.01); *Y10T 407/24* (2015.01)

(58) Field of Classification Search
CPC .......... B23B 327/045; B23B 2200/321; B23B 2200/081; Y10T 407/24; Y10T 407/25;
(Continued)

(56) References Cited

U.S. PATENT DOCUMENTS 8,251,618 B2 * 8/2012 Kobayashi ............ B23B 27/143
407/114
8,585,330 B2 * 11/2013 Yamazaki ............. B23B 27/143
407/113
(Continued)

FOREIGN PATENT DOCUMENTS

CN 201988740 U 9/2011
EP 2682208 A1 1/2014
(Continued)

OTHER PUBLICATIONS

English translation of JP 08039305, Feb. 1996.*
(Continued)

*Primary Examiner* — Alan Snyder
(74) *Attorney, Agent, or Firm* — Viering, Jentschura & Partner mbB

(57) ABSTRACT

A cutting insert includes an insert body, a rake face on an upper surface of an end portion of the insert body, a cutting edge on a ridge between the rake face and an end surface of the insert body, side cutting edges on ridges between the rake face and side surfaces of the insert body, each connected to both end portions of the cutting edge, and a breaker convex portion on the rake face. The breaker convex portion includes two breaker island portions extending toward the side cutting edge as extending closer to the front cutting edge. Each breaker island portion includes from the front cutting edge side a first raised portion, a descending portion which becomes lower from a top portion of the first raised portion, and a second raised portion which becomes higher, from the descending portion, than the top portion of the first raised portion.

19 Claims, 2 Drawing Sheets

(58) Field of Classification Search
CPC ... B23C 5/165; B23C 5/205; B23C 2200/081; B23C 2200/32; B23C 2200/323
See application file for complete search history.

(56) References Cited

U.S. PATENT DOCUMENTS

2012/0210834 A1* 8/2012 Onodera ............... B23B 27/045 82/1.11
2013/0309028 A1* 11/2013 Chistyakov ........... B23B 27/045 407/114
2014/0290450 A1 10/2014 Fujii et al.

FOREIGN PATENT DOCUMENTS

| JP | H08039305 A | 2/1996 |
| JP | H08071807 A | 3/1996 |
| JP | H08294803 A | 11/1996 |
| JP | 2005288613 A | 10/2005 |
| JP | 2006272508 A | 10/2006 |
| WO | 2012117791 A1 | 9/2012 |

OTHER PUBLICATIONS

European Search Report issued in the corresponding European patent application No. 13842418.9 on Apr. 11, 2016, 12 pages.
International Search Report issued in the corresponding International Application No. PCT/JP2013/076357 dated Dec. 24, 2013, 2 pages.

* cited by examiner

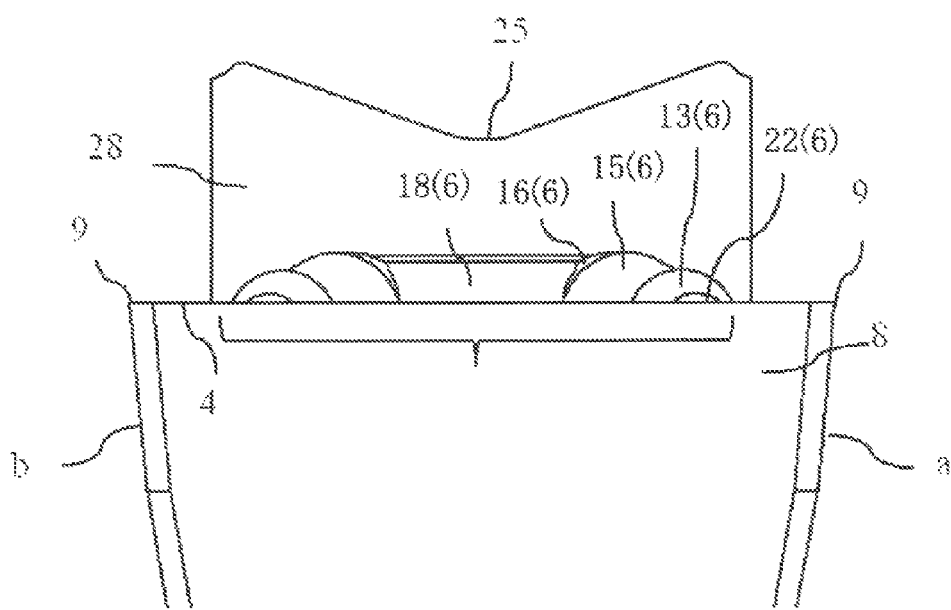

CUTTING INSERT AND CUTTING TOOL

RELATED APPLICATIONS

The present application is a national stage entry according to 35 U.S.C. § 371 of PCT application No.: PCT/JP2013/076357 filed on Sep. 27, 2013, which claims priority from Japanese application No.: 2012-214486 filed on Sep. 27, 2012, and is incorporated herein by reference in its entirety.

TECHNICAL FIELD

The present invention relates to a cutting insert which is provided with a cutting edge for processing a workpiece, and a cutting tool in which the cutting insert is mounted.

BACKGROUND ART

In a cutting tool for grooving or cutting-off, it is desired that generated chips do not abut and damage a processing surface of a workpiece. Thus, it is desirable that after the generated chips move forward along a longitudinal direction of the cutting insert, while the generated chips do not deviate transversely with respect to the longitudinal direction of a cutting insert, the generated chip be curled in a spring shape and be divided in pieces.

For example, PTL 1 discloses a breaker portion which has a Y shape when viewed from an upper side, and in which a tip end portion branches toward both end portions of a front cutting edge, on a rake face of an insert body in a substantial prism shape. In addition, according to PTL 1, the tip end portion which branches toward both end portions has a shape which becomes lower toward a back side from the front cutting edge side.

CITATION LIST

Patent Literature

PTL 1: Japanese Unexamined Patent Application Publication No. 2005-288613

SUMMARY OF INVENTION

Technical Problem

However, in a breaker shape of PTL 1, which has a Y shape when viewed from an upper side, and in which a tip end portion branches toward both end portions of a front cutting edge, chips move forward along a longitudinal direction of a cutting insert. However, depending on cutting conditions, there is a case where chips which move forward along the longitudinal direction extend without being curled, the elongated chips are entangled and get stuck in the cutting edge, and the chips deviate transversely behind the cutting insert and collide with a workpiece.

Solution to Problem

A cutting insert according to the present invention includes: an insert body in a prism shape; a rake face on an upper surface at an end portion of the insert body in a longitudinal direction; a front cutting edge on a ridge line between the rake face and an end surface of the insert body; side cutting edges on ridge lines between the rake face and side surfaces of the insert body, being respectively connected to both end portions of the front cutting edge; and a breaker convex portion on the rake face. The breaker convex portion includes two breaker island portions which extend toward the side cutting edge sides as extending closer to the front cutting edge side. Each of the breaker island portions includes a first raised portion from the front cutting edge side, a descending portion which gradually becomes lower from a top portion of the first raised portion, and a second raised portion which gradually becomes higher, from the descending portion, than the top portion of the first raised portion.

In addition, a cutting tool according to the present invention includes the cutting insert and a holder which includes an insert mounting space. In the cutting tool, the cutting insert is mounted in the holder such that the front cutting edge is located outside the holder.

Advantageous Effects of Invention

According to the cutting insert of the present invention, it is possible to guide chips along a longitudinal direction of an insert body by two breaker island portions of a breaker convex portion. In addition, by a first raised portion, a descending portion, and a second raised portion in the breaker island portions, it is possible to curl chips only by the first raised portion under a cutting condition that a feeding rate is low. Meanwhile, it is possible to make chips abut the first raised portion once even under the cutting condition that the feeding rate is high, and to make chips which move without being curled abut the second raised portion and be curled. As a result, under a wide range of the cutting conditions from a low feeding rate to a high feeding rate, it is possible to perform good chip control.

BRIEF DESCRIPTION OF DRAWINGS

FIG. 2C is a front view of the main part of the cutting insert of FIG. 1.

FIG. 3 is a schematic perspective view illustrating an embodiment of a cutting tool in which the cutting insert in FIGS. 1 and 2 is mounted in a holder.

DESCRIPTION OF EMBODIMENTS

Figure 1:
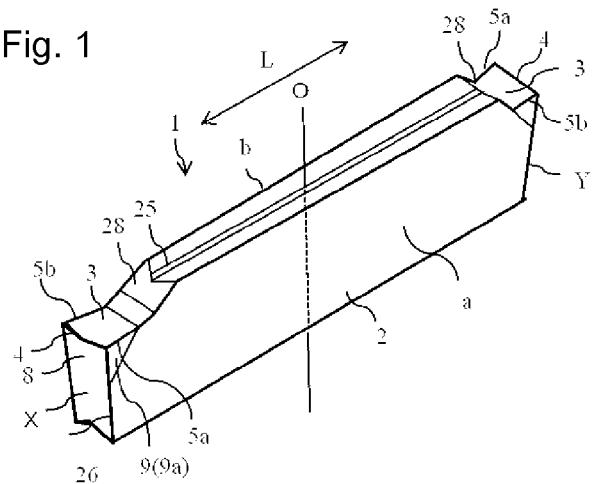
FIG. 1 is a schematic perspective view of a cutting insert in a preferable embodiment of the present invention.

FIGS. 1 to 3 illustrate a preferable embodiment of the present invention, and the description will be given based on these drawings. A cutting insert and a cutting tool according to the embodiment are suitable, particularly, for grooving or cutting-off.

According to FIG. 1, a cutting insert 1 includes: a prism-shaped insert body 2; a rake face 3 on an upper surface at an end portion of the insert body 2 in a longitudinal direction L; a front cutting edge 4 on a ridge line between the rake face 3 and a front side (end surface) of the insert body 2; a pair of side cutting edges 5 (5a, 5b) on a ridge line between the rake face 3 and a side surface of the insert body and connected to both end portions of the front cutting edge 4; and a breaker convex portion 6 which has a convex shape and is provided on the rake face 3.

In addition, a front flank 8 is provided on a front side X at the end portion of the insert body 2 where the rake face 3 is provided. Furthermore, following the pair of side cutting edges 5 (5a, 5b) from the rake face 3, a pair of side flanks 9 (only 9a is viewed in FIG. 1) are provided on the side surfaces of the insert body 2.

The cutting insert 1 in FIG. 1 has a point-symmetrical shape with respect to a center axial line O in a height direction of the insert body 2 as a reference, and the front cutting edge 4, the side cutting edges 5, and the like exist at two locations on the front (one end surface) X side and on a back (the other end surface) Y side. In addition, in the present invention, the configuration is not limited to the above-described configuration, and a configuration in which the front cutting edge 4, the side cutting edges 5, and the like are provided only on one side at the end portion may be employed.

In addition, in order to increase a binding force when mounting the cutting insert 1 in a holder 32 which will be described later, a linking portion 28 is provided on a side close to a center portion side as compared to the rake face 3 of an upper surface of the insert body 2, and a concave groove 25 which has a V shape when viewed from a front side is provided close to the center portion side as compared to the linking portion 28, that is, provided between the rake faces 3, 3 and the linking portions 28, 28 in FIG. 1, along the longitudinal direction L of the insert body 2.

Furthermore, according to FIG. 1, a concave groove 26 which has a V shape when viewed from a front side is provided on an opposite side of the concave groove 25 of the insert body 2, that is, on a bottom surface of the insert body 2, along the entire longitudinal direction L of the insert body 2.

In the cutting insert 1 in FIG. 1, illustration of a shape on the rake face 3, such as the shape of the breaker convex portion 6 or the like, is omitted. In addition, in FIG. 1, one end portion in the longitudinal direction L is referred to as a front X side, the other end portion in the longitudinal direction L is referred to as a back Y side, a lateral side on which the side cutting edge 5a of the front X side and the side flank 9a are provided is referred to as a lateral side a side, and a lateral side on which the side cutting edge 5b of the front X side is provided is referred to as a lateral side b side.

Figure 2A:
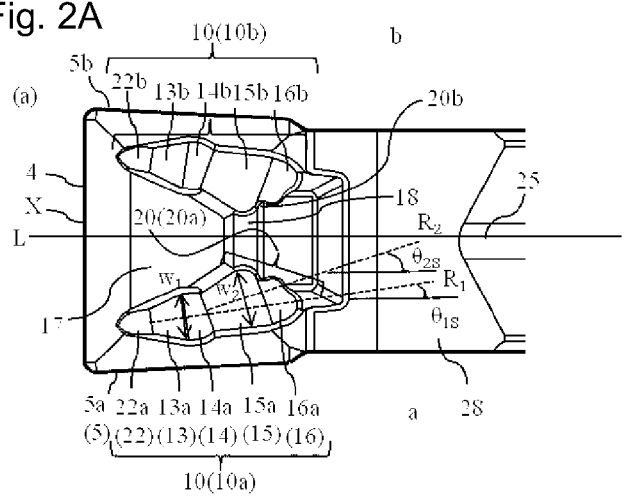
FIG. 2A is a plan view of a main part of the cutting insert of FIG. 1.
Figure 2B:
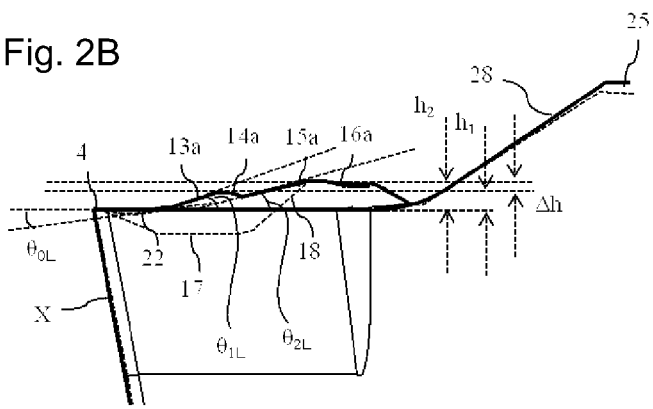
FIG. 2B is a side surface view of the main part of the cutting insert of FIG. 1.

Since FIGS. 2A, 2B, and 2C illustrate the front X side of the insert 1, according to FIG. 2A, the breaker convex portion 6 includes two breaker island portions 10 (10a, 10b) which extend toward side ends of the rake face 3 as extending closer to the front X side which is the front cutting edge 4 side, from the back Y side which is a center portion side of the insert body 2. In other words, the two breaker island portions 10 (10a, 10b) extend toward the side cutting edge 5 side as extending closer to the front cutting edge 4 side, and have a Japanese katakana character "Ha" shape in plan view in which the front cutting edge 4 which is the front X side is positioned at a lower side. In other words, both breaker island portions 10 (10a, 10b) extend away from the side ends of the rake face 3 toward the center portion side (back Y side) of the insert body 2 from the front X side, and a distance between the two breaker island portions 10 (10a, 10b) becomes narrower toward the center portion side (back Y side) of the insert body 2 from the front X side.

In addition, as illustrated in FIG. 2B, the two breaker island portions 10 (10a, 10b) respectively include: first raised portions 13 (13a, 13b) from the front X side; descending portions 14 (14a, 14b) which gradually become lower from a height $h_1$ of the top portion of the first raised portions 13; and second raised portions 15 (15a, 15b) which gradually become higher to a height $h_2$ higher than the height $h_1$ of the top portion of the first raised portions 13 from the descending portions 14. In addition, in FIGS. 2A, 2B, and 2C, on the back Y side of the second raised portions 15, transition surfaces 16 (16a, 16b) for being connected to a center raised portion 18 which will be described later are provided. The transition surfaces 16 have a role of maintaining a strength with which the second raised portions 15 endure collision of chips.

Here, if the height $h_1$ and the height $h_2$ are defined as a height from the front cutting edge 4, a ratio ($\Delta h/h_1$) of a difference $\Delta h$ between the height $h_1$ and the height $h_2$ with respect to the height $h_1$ is 0.4 to 1.8. In addition, "gradually becoming higher" means a case of continuously or stepwisely becoming higher, and includes a case where there is a part in which the height does not change.

According to the above-described configuration, chips which enter from the front X side are bent by the two breaker island portions 10 (10a, 10b) such that the chips have a concave surface shape in a width direction which is a direction perpendicular to the longitudinal direction L of the insert body 2. The two breaker island portions 10 (10a, 10b) are provided to extend toward the side ends of the rake face 3 as extending toward the front X side from the back Y side. Accordingly, if chips which enter from the front X side move forward to the back Y side, the chips are in a state of being nipped between the two breaker island portions 10 (10a, 10b), it is difficult for the chips to jump out to the outside from the portion between the two breaker island portions 10 (10a, 10b), and the chips move forward along the longitudinal direction L of the insert body 2 on the rake face 3.

In addition, the breaker island portions 10 (10a, 10b) include the first raised portions 13, the descending portions 14, and the second raised portions 15. In this configuration, it is possible to curl chips only by the first raised portions 13 under the cutting condition that the feeding rate is low. Meanwhile, even under the cutting condition that the feeding rate is high, the rate is reduced when chips abut the first raised portions 13, and after that, the chips which have the reduced rate abut the second raised portions 15. Accordingly, it is possible to make chips moving without being curled abut the second raised portion 15 and be stably curled. As a result, under the wide range of the cutting conditions from the low feeding rate to the high feeding rate, it is possible to perform good chip control.

In other words, when the first raised portion 13 is not provided and only the second raised portion 15 exists, there is a case where a force of chips which abut the second raised portion 15 is too much, and the chips move over the second raised portion 15, and thus, the chip control is not stable. In addition, in a case where the descending portion 14 is not provided and the height from the first raised portion 13 to the second raised portion 15 gradually becomes higher, when the feeding rate is high, there is a case where chips do not abut the first raised portion 13 and jump over the first raised portion 13, the chips directly abut the second raised portion 15, and a moving speed of the chips is fast and the chips move over the second raised portion 15. Furthermore, if the height of the top portion of the second raised portion 15 is equal to or less than the height of the top portion of the first raised portion 13, when the feeding rate is high, there is a case where chips which move over the first raised portion 13 do not abut the second raised portion 15 and pass through the second raised portion 15.

Here, according to FIGS. 2A, 2B, and 2C, between the two breaker island portions 10 (10a, 10b), from the front X side, a breaker groove 17 and the center raised portion 18 are provided, and both side ends of the center raised portion 18 are respectively coupled to the two breaker island portions 10 (10a, 10b) and constitute the breaker convex portion 6. By the breaker groove 17, chips which enter from the front X side are bent in a more concave surface shape in the width direction. The bottom surface part of the center of the chips is in contact with the center raised portion 18, and has a role of bending and curling chips in a spring shape.

In addition, when viewed from a front side in FIG. 2C, the top portion of the second raised portions 15 (15a, 15b) of the two breaker island portions 10 (10a, 10b) are provided to be higher than the center raised portion 18, and the center raised portion 18 is coupled to coupling portions (20a, 20b) which are positioned at an end portion of the second raised portions 15 (15a, 15b) and the transition surfaces 16 (16a, 16b). In this configuration, a possibility that the number of contact points at which chips bent and having a concave surface shape in the width direction are in contact with the breaker convex portion 6 increases, and it is possible to reduce the moving speed of the chips, to make the chips move forward along the longitudinal direction L, and to more stably curl the chips.

Furthermore, when viewed from the side surface in FIG. 2B, a rising angle $\theta_{1L}$ of the first raised portion 13 is larger than a rising angle $\theta_{2L}$ of the second raised portion 15. Accordingly, even when the feeding rate is high and an amount of chips generated is large, chips which move over the first raised portion 13 do not stay at the second raised portion 15, and the chips can move further to a rear side. A desired range of the rising angle $\theta_{1L}$ is 10° to 30°, and more desirably, 15° to 24°. A desired range of the rising angle $\theta_{2L}$ is 5° to 25°, and more preferably, 13° to 18°.

Here, when viewed from a front side in FIG. 2C, the first raised portion 13 and the second raised portion 15 have convex surfaces which are protruded to an upper side. In addition, although not illustrated, the descending portion 14 which exists behind the first raised portion 13 also has a convex surface which is protruded to the upper side. Since the first raised portion 13, the descending portion 14, and the second raised portion 15 which have such a shape allow chips to pass through in a state where the chips are firmly in contact with a surface of the breaker island portion 10, it is possible to reliably bend the chips.

In addition, in plan view in FIG. 2A, when a line through the top of the convex surface of the first raised portion 13 is a first ridge line $R_1$, and a line through the top of the convex surface of the second raised portion 15 is a second ridge line $R_2$, the first ridge line $R_1$ and the second ridge line $R_2$ exist such that both the first ridge line $R_1$ and the second ridge line $R_2$ extend closer to the side end of the rake face 3 as the breaker island portion extending toward the front side, that is, such that the first ridge line $R_1$ and the second ridge line $R_2$ each extend closer to the side cutting edge 5 which exists nearby in the pair of side cutting edges 5, with respect to the longitudinal direction L of the insert body 2. In this configuration, chips are bent to have a more concave surface shape in the width direction, the chips are suppressed not to pass through the upper part without touching the breaker convex portion 6, and the chips are likely to pass through the upper part in a state of being in contact with the surface of the breaker convex portion 6. As a result, it is possible to reduce the moving speed of chips, and to make the chips move forward along the longitudinal direction L. As a result, it is possible to more stably curl the chips. Furthermore, in plan view in FIG. 2A, a shift angle $\theta_{2S}$ of the second ridge line $R_2$ with respect to the longitudinal direction L of the insert body 2 is larger than a shift angle $\theta_{1S}$ of the first ridge line $R_1$ with respect to the longitudinal direction L of the insert body 2. In this configuration, chips are bent to have a more concave surface shape in the width direction, and the chips are likely to pass through in a state of being in contact with the surface of the breaker convex portion 6. As a result, it is possible to reduce the moving speed of the chips, to make the chips move forward along the longitudinal direction L, and to more stably curl the chips. A desired range of the shift angle $\theta_{1S}$ is 1° to 12°, and more preferably, 4° to 8°. A desired range of the shift angle $\theta_{2S}$ is 8° to 30°, and more preferably, 12° to 25°.

Furthermore, in plan view in FIG. 2A, a maximum width $w_2$ of the second raised portion 15 is larger than a maximum width $w_1$ of the first raised portion 13. In this configuration, even when chips which move over the first raised portion 13 further move being shifted slightly transversely, it is possible to make the chips abut the second raised portion 15 and be curled. Here, since the breaker island portion 10 is disposed to extend closer to the side end of the rake face 3 as extending toward the front side X side from the back Y side, as illustrated in plan view in FIG. 2C, the second raised portion 15 is disposed to be shifted further to the breaker groove 17 side as compared to the first raised portion 13. In addition, since the first raised portion 13 is inclined to the breaker groove 17 side, even when chips which abut the first raised portion 13 once are not curled by the first raised portion 13 and move to the rear side, the chips extend along the longitudinal direction L. The chips which move over the first raised portion 13 and pass through the breaker groove 17 side abut the second raised portion 15 which exists further on the breaker groove 17 side, and are curled by the second raised portion 15.

Furthermore, according to FIGS. 2A, 2B, and 2C, a preliminary raised portion 22 is provided at a portion between the first raised portion 13 and the front cutting edge 4 that is closer to the front X than the first raised portion 13. A rising angle $\theta_{0L}$ of the preliminary raised portion 22 is smaller than the rising angle $\theta_{1L}$ of the first raised portion 13. The preliminary raised portion 22 is provided to smoothly guide chips to the first raised portion 13. A desired range of the rising angle $\theta_{0L}$ is 5° to 15°, and more preferably, 7° to 10°. The rising angle $\theta_{0L}$ indicates an angle of a surface in the preliminary raised portion 22 which is in contact with the first raised portion 13. A tip end side of the preliminary raised portion 22 may be an angle which is larger than the rising angle $\theta_{0L}$. In addition, the preliminary raised portion 22 is not necessarily required, and a shape in which the preliminary raised portion 22 does not exist may also be employed.

In addition, in plan view in FIG. 2A, the two breaker island portions 10 (10a, 10b) are line symmetrical with respect to the center line L which is a straight line through the center of the front cutting edge 4 and is parallel to the longitudinal direction L. In other words, the breaker convex portion of the back Y side is also configured in a similar manner to the breaker convex portion on the front side X side. In this configuration, when a cutting portion of any one of the front X side and the back Y side of the insert 1 is used, it is possible to more reliably control chips on the upper surface of the insert body 2. In addition, the present invention is not limited to this configuration, and in a case of the cutting insert with convenient sides, a line asymmetrical configuration with respect to the center axial line O is not employed.

In addition, the cutting insert 1 in FIGS. 1, 2A, 2B, and 2C is, for example, mounted in the holder 32 as illustrated in FIG. 3, and is used as a cutting tool 30. The throw-away type cutting tool (hereinafter, referred to as a cutting tool) 30 in which the cutting insert 1 is mounted in the holder for grooving (hereinafter, referred to as a holder) 32 of the embodiment illustrated in FIG. 3 is suitable, particularly, for grooving or cutting-off.

The cutting tool 30 is provided with a shank portion 33 which has a substantially rod-like shape, and a head portion 34 which is located on one end side of the shank portion 33 and is formed to be integrated with the shank portion 33. The head portion 34 has, on one lateral side a, an insert mounting space 35, an upper jaw 37 and a lower jaw 38 which form the insert mounting space 35 from above and below, and a slit 39 which extends to the rear side from the insert mounting space 35. In addition, the head portion 34 is provided with an upper jaw linking portion 41 and a lower jaw linking portion 42 which are partitioned by the slit 39, the upper jaw 37 and the upper jaw linking portion 41 are linked to each other, and the lower jaw 38 and the lower jaw linking portion 42 are linked to each other.

Furthermore, a through hole 45 for inserting a screw 43 is provided in the upper jaw linking portion 41, a screw hole (not illustrated) to which the screw 43 is screwed is provided in the lower jaw linking portion 42, and an upper clamp surface 48 and the lower clamp surface 49 respectively exist on a lower surface of the upper jaw 37 and on an upper surface of the lower jaw 38. The screw 43 is put into the screw hole from the through hole 45 of the upper jaw linking portion 41 and is screwed to the screw hole of the lower jaw linking portion 42, thereby fastening the cutting insert 1 mounted in the insert mounting space 35 by the upper clamp surface 48 of the upper jaw 37 and the lower clamp surface 49 of the lower jaw 38. The cutting insert 1 is mounted such that the front cutting edge 4 and the side cutting edge 5 (5a) are located from the tip end side of the insert mounting space 35 to the outside.

In addition, according to FIG. 3, the upper clamp surface 48 in the upper jaw 37 which abuts against the cutting insert 1 and the lower clamp surface 49 in the lower jaw 38 which abuts against the cutting insert 1 have a concave groove or a convex portion (a convex portion protruding to the insert mounting space 35 side in FIG. 3) provided in parallel toward the rear side from the tip end, and the cutting insert 1 has the convex portion or the concave groove (the concave groove 25 and the concave groove 26 which have a V shape and are fitted to the convex portions of the upper clamp surface 48 and the lower clamp surface 49 in FIGS. 1 and 3) provided at a corresponding position which abuts against the concave groove or the convex portion. Accordingly, it is possible to suppress a positional shift of the cutting insert 1, and to enhance a binding force for the cutting insert 1. In addition, in FIG. 3, in order to provide clearance to avoid contact with the workpiece, a region which is located on a lateral side of the cutting insert 1 of the lower jaw 38 is cut out to be a lower jaw adjacent portion 47.

An exemplary embodiment of the present invention is described above, but it goes without saying that the present invention is not limited to the embodiment, and an arbitrary embodiment without departing from a purpose of the present invention can be employed.

REFERENCE SIGNS LIST

1 Cutting insert
2 Insert body
3 Rake face
4 Front cutting edge
5 (5a, 5b) Side cutting edge
6 Breaker convex portion
8 Front flank
9 (9a) Side flank
10 (10a, 10b) Breaker island portion
13 (13a, 13b) First raised portion
14 (14a, 14b) Descending portion
15 (15a, 15b) Second raised portion
16 (16a, 16b) Transition surface
17 Breaker groove
18 Center raised portion
20 (20a, 20b) Coupling portion
22 (22a, 22b) Preliminary raised portion
25, 26 Concave groove
28 Linking portion
30 Cutting tool
32 Holder
33 Shank portion
34 Head portion
35 Insert mounting space
37 Upper jaw
38 Lower jaw
39 Slit
41 Upper jaw linking portion
42 Lower jaw linking portion
43 Screw
45 Through hole
47 Lower jaw adjacent portion
48 Upper clamp surface
49 Lower clamp surface
X Front side
Y Back side
a One lateral side
b The other lateral side
$R_1$ First ridge line
$R_2$ Second ridge line
$\theta_{1L}$ Rising angle of first raised portion
$\theta_{2L}$ Rising angle of second raised portion
$\theta_{1S}$ Shift angle of insert body of first ridge line with respect to longitudinal direction
$\theta_{2S}$ Shift angle of insert body of second ridge line with respect to longitudinal direction
$w_1$ Maximum width of first raised portion
$w_2$ Maximum width of second raised portion

The invention claimed is:

1. A cutting insert, comprising:
an insert body in a prism shape;
a rake face on an upper surface at an end portion of the insert body in a longitudinal direction;
a front cutting edge on a ridge line between the rake face and an end surface of the insert body;
side cutting edges on ridge lines between the rake face and side surfaces of the insert body, being respectively connected to the front cutting edge; and
a breaker convex portion on the rake face,
wherein the breaker convex portion includes two breaker island portions which extend toward the side cutting edge sides as extending closer to the front cutting edge side, each of the breaker island portions includes from the front cutting edge side a first raised portion, a descending portion which gradually becomes lower from a top portion of the first raised portion, and a second raised portion which gradually becomes higher, from the descending portion, than the top portion of the first raised portion, and
wherein, between the two breaker island portions, a breaker groove and a center raised portion are provided from the front cutting edge side, and both side ends of the center raised portion are respectively coupled to both rear end parts of the two breaker island portions furthest from the front cutting edge.

2. The cutting insert according to claim 1,
wherein a top portion of the second raised portion of the two breaker island portions is higher than a top portion of the center raised portion.

3. The cutting insert according to claim 1,
wherein, in side view, a rising angle of the first raised portion is larger than a rising angle of the second raised portion.

4. The cutting insert according to claim 1,
wherein the first raised portion, the descending portion, and the second raised portion include convex surfaces protruding to an upper side.

5. The cutting insert according to claim 4,
wherein, in plan view, when a line through the top of the convex surface of the first raised portion is a first ridge line, and a line through the top of the convex surface of the second raised portion is a second ridge line, the first ridge line and the second ridge line are provided to extend closer to a side end of the rake face as the breaker island portion extending toward the end surface side with respect to the longitudinal direction of the insert body.

6. The cutting insert according to claim 5,
wherein a shift angle of the second ridge line with respect to the longitudinal direction of the insert body is larger than a shift angle of the first ridge line with respect to the longitudinal direction of the insert body.

7. The cutting insert according to claim 1,
wherein, in plan view, a maximum width of the second raised portion is larger than a maximum width of the first raised portion.

8. The cutting insert according to claim 1,
wherein a preliminary raised portion is provided at a portion closer to the front cutting edge than the first raised portion, and a rising angle of the preliminary raised portion is smaller than the rising angle of the first raised portion.

9. The cutting insert according to claim 1,
wherein the two breaker island portions are line symmetrical with respect to a center line which passes through the center of the front cutting edge and is parallel to the longitudinal direction of the insert body.

10. A cutting tool, comprising:
The cutting insert according to claim 1, and
a holder which includes an insert mounting space,
wherein the cutting insert is mounted in the insert mounting space of the holder such that the front cutting edge of the cutting insert is located outside the holder.

11. A cutting insert, comprising:
an insert body in a prism shape;
a rake face on an upper surface at an end portion of the insert body in a longitudinal direction;
a front cutting edge on a ridge line between the rake face and an end surface of the insert body;
side cutting edges on ridge lines between the rake face and side surfaces of the insert body, being respectively connected to the front cutting edge; and
a breaker convex portion on the rake face, wherein the breaker convex portion includes two breaker island portions which extend toward the side cutting edge sides as extending closer to the front cutting edge side, each of the breaker island portions includes from the front cutting edge side a first raised portion, a descending portion which gradually becomes lower from a top portion of the first raised portion, and a second raised portion which gradually becomes higher, from the descending portion, than the top portion of the first raised portion, wherein, between the two breaker island portions, a breaker groove and a center raised portion are provided from the front cutting edge side, and both side ends of the center raised portion are respectively coupled to the two breaker island portions, and wherein the center raised portion is located farther from the front cutting edge than the descending portion.

12. The cutting insert according to claim 11,
wherein a top portion of the second raised portion of the two breaker island portions is higher than a top portion of the center raised portion.

13. The cutting insert according to claim 11,
wherein, in side view, a rising angle of the first raised portion is larger than a rising angle of the second raised portion.

14. The cutting insert according to claim 11,
wherein the first raised portion, the descending portion, and the second raised portion include convex surfaces protruding to an upper side.

15. The cutting insert according to claim 14,
wherein, in plan view, when a line through the top of the convex surface of the first raised portion is a first ridge line, and a line through the top of the convex surface of the second raised portion is a second ridge line, the first ridge line and the second ridge line are provided to extend closer to a side end of the rake face as the breaker island portion extending toward the end surface side with respect to the longitudinal direction of the insert body.

16. The cutting insert according to claim 15,
wherein a shift angle of the second ridge line with respect to the longitudinal direction of the insert body is larger than a shift angle of the first ridge line with respect to the longitudinal direction of the insert body.

17. The cutting insert according to claim 11,
wherein, in plan view, a maximum width of the second raised portion is larger than a maximum width of the first raised portion.

18. The cutting insert according to claim 11,
wherein a preliminary raised portion is provided at a portion closer to the front cutting edge than the first raised portion, and a rising angle of the preliminary raised portion is smaller than the rising angle of the first raised portion.

19. The cutting insert according to claim 11,
wherein the two breaker island portions are line symmetrical with respect to a center line which passes through the center of the front cutting edge and is parallel to the longitudinal direction of the insert body.

* * * * *